United States Patent
Deng

(10) Patent No.: US 10,693,597 B2
(45) Date of Patent: Jun. 23, 2020

(54) METHOD AND APPARATUS FOR TRANSMITTING STATUS REPORT FOR RECEIVER

(71) Applicant: SPREADTRUM COMMUNICATIONS (SHANGHAI) CO., LTD., Zhangjiang Shanghai (CN)

(72) Inventor: Yun Deng, Shanghai (CN)

(73) Assignee: SPREADTRUM COMMUNICATIONS (SHANGHAI) CO., LTD., Shanghai (CN)

(*) Notice: Subject to any disclaimer, the term of this patent is extended or adjusted under 35 U.S.C. 154(b) by 187 days.

(21) Appl. No.: 15/871,507

(22) Filed: Jan. 15, 2018

(65) Prior Publication Data

US 2018/0227086 A1    Aug. 9, 2018

(30) Foreign Application Priority Data

Feb. 4, 2017    (CN) .......................... 2017 1 0064647

(51) Int. Cl.
   *H04L 1/18* (2006.01)
   *H04L 1/16* (2006.01)
   *H04W 80/02* (2009.01)
   *H04W 72/04* (2009.01)

(52) U.S. Cl.
   CPC .......... *H04L 1/1812* (2013.01); *H04L 1/1635* (2013.01); *H04L 1/1685* (2013.01); *H04L 1/189* (2013.01); *H04L 1/1864* (2013.01); *H04L 1/1896* (2013.01); *H04W 72/0413* (2013.01); *H04W 80/02* (2013.01)

(58) Field of Classification Search
   CPC ... H04L 1/1812; H04L 1/1685; H04L 1/1896; H04L 1/1864; H04L 1/1635; H04L 1/189; H04W 80/02; H04W 72/0413
   See application file for complete search history.

(56) References Cited

U.S. PATENT DOCUMENTS

| | | | |
|---|---|---|---|
| 2003/0037033 A1* | 2/2003 | Nyman | H04L 29/12264 |
| 2003/0060235 A1* | 3/2003 | Yamato | H04L 29/12264 455/561 |
| 2004/0242221 A1* | 12/2004 | Vincent | H04L 1/243 455/423 |
| 2008/0301516 A1* | 12/2008 | Han | H04L 1/1812 714/748 |
| 2012/0195250 A1* | 8/2012 | Jain | H04L 1/1614 370/312 |
| 2013/0034014 A1* | 2/2013 | Jonsson | H04W 24/10 370/253 |
| 2013/0044726 A1* | 2/2013 | Shrivastava | H04W 28/065 370/329 |
| 2015/0146617 A1* | 5/2015 | Park | H04W 24/10 370/328 |
| 2016/0219458 A1* | 7/2016 | Kubota | H04W 28/0273 |
| 2017/0331670 A1* | 11/2017 | Parkvall | H04L 41/0816 |

* cited by examiner

*Primary Examiner* — Ajit Patel
*Assistant Examiner* — Wilfred Thomas
(74) *Attorney, Agent, or Firm* — Cantor Colburn LLP

(57) ABSTRACT

A method and apparatus for transmitting status report applied for a receiver is provided, the method comprises: determining a format of a RLC status report; transmitting the RLC status report to a sender, according to the format of the RLC status report; wherein the receiver is a receiver of a service data, and the sender is a sender of a service data. By this method and apparatus, the transmission efficiency of the status report transmitting method can be improved.

10 Claims, 3 Drawing Sheets

S11 — determining a format of a RLC status report

S12 — transmitting the RLC status report to a sender, according to the format of the RLC status report

METHOD AND APPARATUS FOR TRANSMITTING STATUS REPORT FOR RECEIVER

CROSS-REFERENCE TO RELATED APPLICATIONS

The present application claims priority under 35 U.S.C. § 119 to Chinese Patent Application No. CN201710064647.4, filed on Feb. 4, 2017, the entire contents of which are incorporated herein by reference.

TECHNICAL FIELD

The present disclosure generally relates to communication technology field, and more particularly, to a method and apparatus for transmitting status report applied for a receiver.

BACKGROUND

In a mobile communication system, a radio link control protocol (RLC) belongs to a part of a layer 2 protocol, and it has a segmentation and automatic repeat-reQuest function (ARQ), and uses two mechanisms of acknowledgment and timeout, to realize a reliable information transmission on a basis of an unreliable link.

In order to ensure a reliable transmission, a receiver sends a RLC layer status report (i. e, RLC status report) to a sender, wherein the status report may include information such as a sequence number of a packet not received and the like. After receiving the status report, the sender may retransmit the packet not received as indicated in the status report.

In a Long Term Evolution (LTE) system, the RLC layer status report may include one or more sequence number (NACK SN) of the RLC layer data packets (i.e. RLC PDUs) that are not received or unacknowledged.

In 5G NR (New Radio), continuing applying a current RLC layer status report will result in an information redundancy, and a low transmission efficiency.

SUMMARY

Embodiments of the present disclosure provide a method and apparatus to improve transmission efficiency of the status report.

In an embodiment, a method for transmitting status report at a receiver is provided, including: determining a format of a RLC status report; transmitting the RLC status report to a sender, according to the format of the RLC status report; wherein the receiver is a receiver of a service data, and the sender is a sender of a service data.

Optionally, where determining a format of a RLC status report may include: identifying the format of the RLC status report configured by the sender.

Optionally, where the format of the RLC status report is configured per data radio bearer, or, the format of the RLC status report is configured per quality of service Flow mapped on a same data radio bearer.

Optionally, where determining a format of a RLC status report includes configuring the format of the RLC status report by the receiver, and the method for transmitting status report may further include: indicating the format of the RLC status report to the sender.

Optionally, where the format of the RLC status report to the sender is indicated in the RLC status report.

Optionally, where determining a format of a RLC status report, may include: receiving a selection criterion for the RLC status report configured by the sender; selecting and configuring the format of the RLC status report from pre-configured formats according to the selection criterion.

Optionally, where the selection criterion may include any one of the following: selecting the format of the RLC status report according to a rate threshold of the data radio bearer or data stream; selecting the format of the RLC status report according to the number of bits required to transmit the RLC status report in different pre-configured formats; selecting the format of the RLC status report according to the number of RLC data packets transmitted in a single TTI; or selecting the format of the RLC status report according to the number of RLC data packets consecutively not received.

Optionally, where the format of the RLC status report may be set according to any one of the following: a rate of a data radio bearer, bit number of RLC status reports in different formats, the number of RLC data packets transmitted within a single TTI, the number of RLC data packets consecutively not received, or a device type of the receiver.

Optionally, where the device type of the receiver may include a machine type communication device and a non-machine type communication device.

Optionally, where the receiver is an user equipment and the sender is a base station, or, the receiver is a base station and the sender is an user equipment, or, both the sender and the receiver are user equipments.

In an embodiment, an apparatus for transmitting status report applied for a receiver is provided, including: a format determining circuitry, configured to determine a format of a RLC status report; a status transmitting circuitry, configured to transmit the RLC status report to a sender, according to the format of the RLC status report; where the receiver is a receiver of a service data, and the sender is a sender of a service data.

Optionally, where the format determining circuitry, may be configured to receive the format of the RLC status report configured by the sender.

Optionally, where the format of the RLC status report may be configured per data radio bearer, or, the format of the RLC status report may be configured per QoS Flow mapped on a same data radio bearer.

Optionally, where the format determining circuitry may be configured to determine the format of the RLC status report by the receiver, and the apparatus for transmitting status report may further include: a format indicating circuitry, configured to indicate the format of the RLC status report to the sender.

Optionally, where the format indicating circuitry, may be configured to indicate the format of the RLC status report to the sender in the RLC status report.

Optionally, where the format determining circuitry, may include: a selection criterion receiving sub-circuitry, configured to receive a selection criterion set for the RLC status report by the sender; a format selecting sub-circuitry, configured to select and set the format of the RLC status report from pre-configured formats according to the selection criterion.

Optionally, where the selection criterion may include any one of the following: selecting the format of the RLC status report according to a rate threshold of the data radio bearer or data stream; selecting the format of the RLC status report according to the number of bits required to transmit the RLC status report in different pre-configured formats; selecting the format of the RLC status report according to the number of RLC data packets transmitted in a single TTI; or selecting the format of the RLC status report according to the number of RLC data packets consecutively not received.

Optionally, where the format of the RLC status report may be selected according to any one of the following: a rate of a data radio bearer, bit number of RLC status reports in different formats, the number of RLC data packets transmitted within a single TTI, the number of RLC data packets consecutively not received, or a device type of the receiver.

Optionally, where the device type of the receiver may include a machine type communication device and a non-machine type communication device.

Optionally, where the receiver may be a user equipment and the sender may be a base station, or, the receiver may be a base station and the sender may be a user equipment, or, both the sender and the receiver may be user equipments.

Embodiments of the present disclosure may provide following advantages.

In some embodiments of this disclosure, a format of a RLC status report is determined first, and then the RLC status report is transmitted to a sender according to the format of the RLC status report. The format of the RLC status report can be flexibly determined as needed, so that the format of the RLC status report can be made more diverse. Thus, in the embodiments of the present disclosure, different RLC status reports can be used according to different scenarios, which makes the format of the RLC status report more effective, and more suitable. Therefore, transmission of the RLC status report may need fewer bits, which further improves the transmission efficiency of the method for transmitting status report.

Further, the format of the RLC status report is configured by the sender, and transmitted to the receiver by the sender, the receiver can transmit the RLC status report directly according to the format configured by the sender, so that the calculation amount of the receiver is small, which can be beneficial to save resources of the receiver; and as the format of the RLC status report is configured by the sender, the sender and the receiver only need to communicate once to determine the format of the RLC status report, which can improve the efficiency of the method for transmitting status report.

In addition, in the case that the format of the RLC status report is configured by the receiver, the format can be configured according to a specific parameter of a current scenario. Therefore, the transmission of the RLC status report can be carried out with fewer bits, which can further improve the transmission efficiency of the method for transmitting status report.

DETAILED DESCRIPTION

As described in the background, in 5G NR (New Radio), continuing applying a current RLC layer status report will result in an information redundancy, and low transmission efficiency.

Based on analysis, inventor finds that, the above problems are caused because in the existing solutions, a RLC layer status report sent by a receiver can indicate a sequence number of a packet that is not received or is not acknowledged, while in the 5G, when the RLC layer does not have a concatenation function, multiple RLC Layer data packets can be transmitted within a transmission time interval (TTI), once the receiver can not accurately decode the packets, multiple RLC layer data packets can lost consecutively. In the 5G, a TTI may be a duration of a sub frame or a slot, or only a duration of a portion of the slot.

Therefore, if the current RLC layer status report is used, the sequence number of multiple RLC layer data packets needs to be indicated to the sender one by one, which can result in an information redundancy, and further result in low transmission efficiency.

In some embodiments of this disclosure, determining a format of a RLC status report first, and then transmitting the RLC status report to a sender, according to the format of the RLC status report. As the format of the RLC status report can be flexibly determined as needed, so that the format of the RLC status report can be made more diverse. Thus, in the embodiments of the present disclosure, different RLC status reports can be used in different scenarios, so that the format of the RLC status report can be made more effective, and more suitable for the current scenario, so that fewer bits need to be used to transmit the RLC status report, and can further improve the transmission efficiency of the method for transmitting status report.

In order to clarify the object, solutions and advantages of embodiments of the present disclosure, embodiments of present disclosure will be described clearly in detail in conjunction with accompanying drawings.

Figure 1:
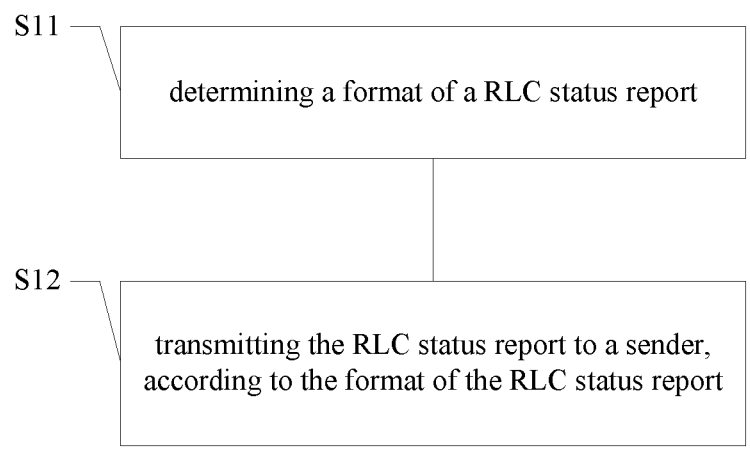
FIG. 1 schematically illustrates a flow chart of a method for transmitting status report applied for a receiver according to an embodiment of this disclosure.

FIG. 1 schematically illustrates a flow chart of a method for transmitting status report applied for a receiver according to embodiments of this disclosure, the method can include the following steps:

Step S11: determining a format of a RLC status report.

Step S12: transmitting the RLC status report to a sender, according to the format of the RLC status report.

Where, a receiver and a transmitter are defined by a transmission direction of a service data, the device which receives the service data is the receiver, and the device which transmits the service data is the transmitter.

For example, during a process of transmitting a downlink service data, the base station transmits the service data to the user equipment (UE), the base station serves as the transmitter, the UE serves as the receiver;

during a process of transmitting a uplink service data, the UE transmits the service data to the base station, the base station serves as the receiver, the UE serves as the transmitter;

With a development of technology, for example, in a specific application of 5G, if the UE transmits the data between each other directly, both the sender and the receiver can be the UE, the UE that sends the service data is the sender, and the UE that receives the service data is the receiver.

Those skilled in the art can understand that, the RLC status report is a control data corresponding to the service data, and the transmission direction thereof may be different from the transmission direction of the service data.

In a specific implementation of the step S11, the format of the RLC status report is determined by the receiver. Specifically, the format of the RLC status report may be configured by the sender and sent to the receiver; or, the format of the RLC status report may also be set by the receiver.

When the format of the RLC status report is configured by the sender, the receiver can receive the format of the RLC status report configured by the sender, to determine the format of the RLC status report.

The format of the RLC status report can also be configured and determined by the receiver. For example, the receiver may configure the format of the RLC status report based on a communication requirement or a communication condition, or, the receiver may also configure the format of the RLC status report based on a selection criterion received from the sender.

When the format of the RLC status report can also be configured by the receiver, the receiver can indicate the determined format of the RLC status report to the sender, after configuring the format of the RLC status report. For example, the format of the RLC status report may be indicated to the sender in the RLC status report.

The format of the RLC status report can be a pre-configured format (for example, predefined formats in the specification), and the pre-configured format can be numbered, when configuring the format of the RLC status report, a corresponding number can be specified, and then indicate to a following peer, the sender and the receiver can be a peer to each other. For example, when the format of the RLC status report is configured by the sender, the number of the format can be indicated to the receiver.

In order to make the specific implementation of the embodiments of this disclosure easier to understand, a specific configuring method of the format of the RLC status report is further described separately.

First, a specific configuring process of the format of the RLC status report configured by the sender is further described. The sender can configure the format of the RLC status report per data radio bearer, or can configure the format of the RLC status report per Quality of Service (QoS) Flow mapped on the same data radio bearer.

The format of the RLC status report is configured by the sender, and the format of the RLC status report is also transmitted to the receiver by the sender, the receiver can transmit the RLC status report directly according to the format configured by the sender, so that the calculation amount of the receiver is small, which can be beneficial to save resources of the receiver; and as the format of the RLC status report is configured by the sender, the sender and the receiver only need to communicate once to determine the format of the RLC status report, which can improve the efficiency of the method for transmitting status report.

When different QoS Flows are mapped on a same data radio bearer, by configuring the format of the RLC status report per different QoS Flows, the format of the RLC status report can be more effective, the receiver can generate RLC status reports with corresponding format for different QoS Flows separately, and therefore the transmission of the RLC status report can be carried out with fewer bits, which can further improve the transmission efficiency of the method for transmitting status report.

When the format of the RLC status report is configured by the receiver, in some embodiments, two methods can be used to configure the format:

A first method: configuring and determining the format of the RLC status report directly by the receiver. Specifically, the format of the RLC status report can be configured according to any one parameter of the following: a rate of a data radio bearer, bit number of RLC status reports in different formats, the number of RLC data packets (i.e. RLC PDUs) transmitted within a single TTI, the number of RLC data packets consecutively not received, or a device type of the receiver.

Where, the device type of the receiver can include a machine type communication (MTC) device and a non-machine type communication device.

When the receiver configures the format of the RLC status report, a specific parameter type can be determined according to a pre-configured rule, and the format of the RLC status report is configured according to the parameter. The format of the RLC status report can be configured by the receiver, and the format can be configured according to a specific parameter of a current scenario, the format configuring is more suitable for the current scenario, so that the transmission of the RLC status report can be carried out with fewer bits, which can further improve the transmission efficiency of the method for transmitting status report.

For example, when the format is configured according to the number of bits of the RLC status report in different formats, by comparing the number of bits of the RLC status report in different formats, the format with the least number of bits can be selected, and then transmit the status report in this format, so the resource occupation can be reduced and the transmission efficiency of the method for transmitting status report can be improved.

After configuring and determining the format of the RLC status report, the receiver indicates the format of the RLC status report to the sender, and the sender and the receiver can determine the format of the RLC status report with only one communication, and further the efficiency of the method for transmitting status report can be improved.

A second method: the receiver selects and configures the format of the RLC status report from pre-configured formats according to a received selection criterion.

Figure 2:
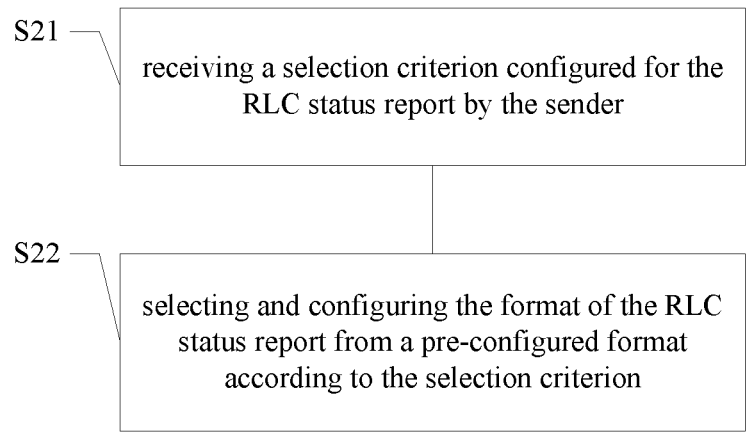
FIG. 2 schematically a flow chart of a specific example of step S11 in FIG. 1.

Referring to FIG. 2, in the second method, step S11 in FIG. 1 may include the following steps:

Step S21: receiving a selection criterion configured for the RLC status report by the sender.

Step S22: selecting and configuring the format of the RLC status report from pre-configured formats according to the selection criterion.

Where the selection criterion can include any one of the following: selecting the format of the RLC status report according to a rate threshold of the data radio bearer or data stream; selecting the format of the RLC status report according to the number of bits required to transmit the RLC status report in different pre-configured formats; selecting the format of the RLC status report according to the number of RLC data packets transmitted in a single TTI; or selecting the format of the RLC status report according to the number of RLC data packets consecutively not received.

Compared to the first method, we can see, the selection criterion may indicate the type of format parameter used to configure the RLC status report, in addition, when a specific value of the parameter needs to be compared with the threshold value, the selection criterion may include a corresponding threshold. For example, when the selection criterion indicates that the receiver selects the format of the RLC status report based on the number of RLC data packets transmitted within a single TTI, the selection criterion may also include a threshold for the number of the RLC data packet.

Since the selection criterion are determined by the sender, the format of the RLC status report is configured by the receiver according to the selection criterion and the current parameter value, therefore the selection process of the format of the RLC status report has both the participation of the sender and the receiver. As a result, the format of the RLC status report is more effective, so that the transmission of the RLC status report in this format can take up less bits, which can further improve the transmission efficiency of the method for transmitting status report.

From above, as the format of the RLC status report is configured by the receiver, the format can be configured according to a specific parameter of the current scenario, the format configuring is more suitable for the current scenario, so that the transmission of the RLC status report can be carried out with fewer bits, which can further improve the transmission efficiency of the method for transmitting status report.

Those skilled in the art can understand that, in addition to the above two methods, other methods can also be used for configuring the format of the RLC status report by the receiver.

The method for transmitting status report in the embodiment of the present disclosure is described below in conjunction with embodiment 1 to embodiment 4. Where, in the embodiment 1 and the embodiment 2, the format of the RLC status report is determined by the sender, in the embodiment 3 and the embodiment 4, the format of the RLC status report is determined by the receiver.

Embodiment 1

Figure 3:
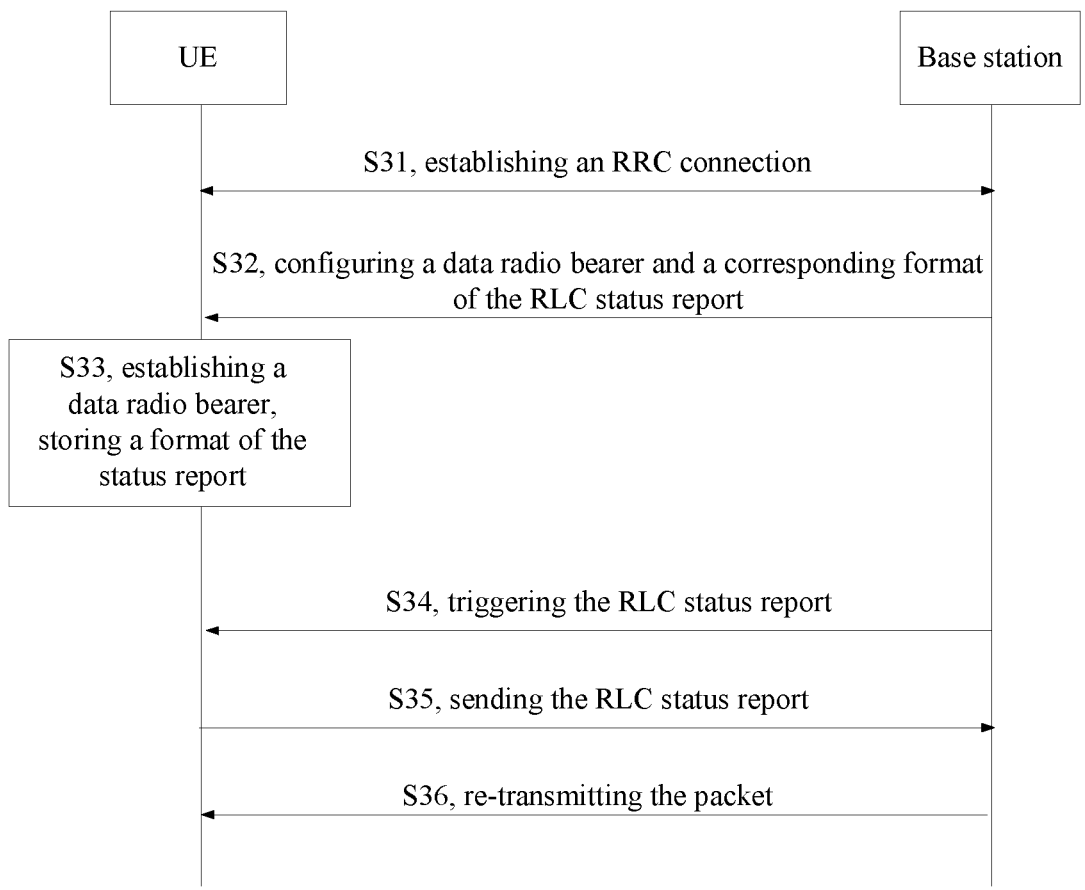
FIG. 3 schematically illustrates a flow chart of a method for transmitting status report applied for a receiver according to an embodiment of this disclosure.

Referring to FIG. 3, in the embodiment 1, the transmission of the status report can be completed by the following steps:

Step S31: establishing an RRC (Radio Resource Control) connection.

The UE accesses the network and establishes an RRC connection.

Step S32: configuring a data radio bearer and a corresponding format of the RLC status report.

If the UE has a service requirement to establish a data radio bearer, the base station can configure relevant parameters of the data radio bearer for the UE, such as an identification of the data radio bearer and a configuration parameter of the layer 2 and the like, the base station can configure a format of the RLC status report for the data radio bearer, and then send to the UE by a RRC signaling.

In this embodiment, if the base station determines that the bearer is a low rate bearer according to a service quality parameter of the bearer, the base station can configure the format of the RLC status report corresponding to the bearer to be format 1, otherwise the base station can configure the format to be format 2.

Where, the format 1 may be reported with every sequence number of the RLC data packets not received, and format 2 may be reported with a start sequence number of RLC data packet not received and the number of packets not received continuously.

Step S33: establishing a data radio bearer, storing a format of the status report.

After receiving a signaling, the UE can apply the configuration parameter included in the signaling, to establish the data radio bearer. For the format of the RLC status report of the bearer configured by the base station, the UE needs to store it for use when need to report a RLC status report.

Step S34: triggering the RLC status report.

The base station triggers the UE to send a RLC layer status report, and the base station may send an indication to the UE at the RLC layer, to trigger the UE to send the RLC layer status report.

Step S35: sending the RLC status report.

After receiving the trigger indication of the status report, the UE can generate the RLC status report of the corresponding format, according to the format of the RLC status report corresponding to the bearer configured by the base station. Then the UE sends the RLC layer status report to the base station.

Step S36: re-transmitting the data packet.

After receiving the status report, the base station can retransmit a corresponding data packet, according to the sequence number of the RLC data packet in which is not acknowledged or not received, so that the UE can receive the packet completely.

In this embodiment, only the RLC status report in two formats is taken as an example, while the base station may also configure other format of the RLC status reports according to a certain data radio bearer, as long as the receiver can use the reported information to assist the sender in determining the RLC data packet is not transmitted successfully.

Embodiment 2

In NR, a data radio bearer can carry different QoS Flows. The base station may configure a different format of the RLC status report for QoS Flows of different QoSs mapped on the same data radio bearer, and then transmit the configuration information to the UE via a RRC signaling.

After receiving the configuration information, and when the RLC status report needs to be reported, the UE can report the corresponding RLC status report according to the format of the status report corresponding to the different QoS Flows of the data radio bearer, based on the configuration of the base station. If a specific data radio bearer contains two QoS Flows, the base station can configure the format of the RLC status report for these two different QoS flows separately, after receiving the RLC status report, when the UE needs to report the RLC status report, the UE can generate the RLC status report in the corresponding format of for different QoS Flows respectively, and then send to the base station.

Embodiment 3

Take a process that a UE starts transmitting data after access to the network as an example, where the data is a downlink data. The UE receives the data from the base station, the UE is the receiver and the base station is the sender.

The UE may determine the format of the RLC status report, and may indicate the format of the selected RLC status report in the RLC status report. Here, only two status report formats are described as an example, but embodiments of this present disclosure are not limited to only two status report formats. Format 1 is to report the sequence number of each RLC data packet that is not received, and format 2 is to report a starting sequence number of the RLC data packet that is not received and the number of packets that are not received continuously.

The UE may establish a plurality of data radio bearers, and determine the format of the RLC status report for each data radio bearer, and then report the RLC status report in a determined format of the RLC status report. Several ways can be used for the UE to determine the format of the RLC status report:

The UE can based on the rate of the data radio bearer, for example a high rate DRB uses the status report in format 2, and a low rate DRB uses the status report in format 1, where the rate refers to a transmission rate, because the downlink is considered, so the rate refers to a transmission rate of the downlink data, the UE may pre-configure a first rate threshold in advance and determine the format of the RLC status report according to a comparison result of the DRB rate with the first rate threshold, when the DRB rate is greater than or equal to the first rate threshold, the status report in format 2 is used, when the rate of DRB is lower than the first rate threshold, the status report in format 1 is used;

Alternatively, the UE may configure the format of the RLC status report, based on the number of bits occupied by the RLC status report in different formats. The UE may choose the RLC status report with a smaller number of bits according to the number of bits required for the status report of the two formats first, and then report it to the base station;

Alternatively, the UE may select the format of the RLC status report based on the number of RLC PDUs transmitted within a TTI. For example, if the number of RLC PDUs transmitted within a single TTI exceeds or is more than a pre-configured second threshold, the status report format of format 2 is used, and if the number of RLC PDUs transmitted within a single TTI is lower than the pre-configured second threshold, the status report format of format 1 is used;

Alternatively, the UE may select the format of the RLC status report based on the number of RLC PDUs that are not received consecutively. For example, if the UE continues not receiving multiple RLC PDUs, and the number of RLC PDU that is not received consecutively is equal to or exceeds a pre-configured third threshold, the status report format of format 2 is used, otherwise the status report format of format 1 is used;

Alternatively, the UE may also configure the format of the RLC status report according to its own device type, for example, if the type of the UE is a machine type communication device, select format 1 as the format of the RLC status report, otherwise format 2 is selected.

When sending the RLC status report to the base station, the UE can indicate the selected format of the RLC status report in the status report, so that the base station can correctly decode the RLC status report. The UE may indicate the selected format of the RLC status report at a particular location in the status report, such as the first bit in the status report may be used to indicate as a data or a status report, the second bit may be used to indicate the format of the RLC status report is format 1 or format 2.

After resolving the status report, the base station may choose to retransmit the unacknowledged data packets to the UE.

Embodiment 4

When the base station configures a radio parameter for the UE, the selection criterion of the format of the RLC status report can be configured simultaneously, so that the UE can determine the format of the reported RLC status report, according to the selection criterion, after receiving the selection criterion.

For example, the base station can configure the selection criterion to be based on the rate threshold, and at the same time the base station can configure a specific threshold, if the rate of the data radio bearer is lower than that specific threshold, a specific RLC status report format is used, if the rate of the data radio bearer is higher than or equal to the specific threshold, a corresponding format of the RLC status report is used.

Alternatively, the base station may configure the selection criterion to be the RLC status report with the smallest bit number, the UE can determine the number of bits that need to be occupied by the RLC status report with different formats first, and then report the RLC status report with the smallest number of bits when the RLC status report needs to be sent.

Alternatively, the base station may configure the selection criterion to be based on the number of RLC PDUs transmitted within a single TTI, the base station may configure a specific number threshold, if the number of RLC PDUs transmitted within a single TTI exceeds or is equal to the number threshold, format 2 is used as the status report format, if is lower than the number threshold, format 1 is used as the status report format.

Alternatively, the base station may configure the selection criterion to be based on the number of RLC PDUs that are not received consecutively, the base station may configure a specific number threshold, if the UE continues not receiving multiple RLC PDUs consecutively, and the number is equal to or exceeds that number threshold, format 2 is used to be the format of the status report, otherwise format 1 is used to be the format of the status report.

In the above embodiments, only the downlink data transmission is taken as examples, where the base station is the transmitter and the UE is the receiver. The method in the above embodiments is also applicable to the uplink data transmission, where the base station is the receiver and the UE is the sender. Alternatively, the method in the above embodiments may be applicable to the status report transmission between the UEs, where both the sender and the receiver is UE.

Figure 4:
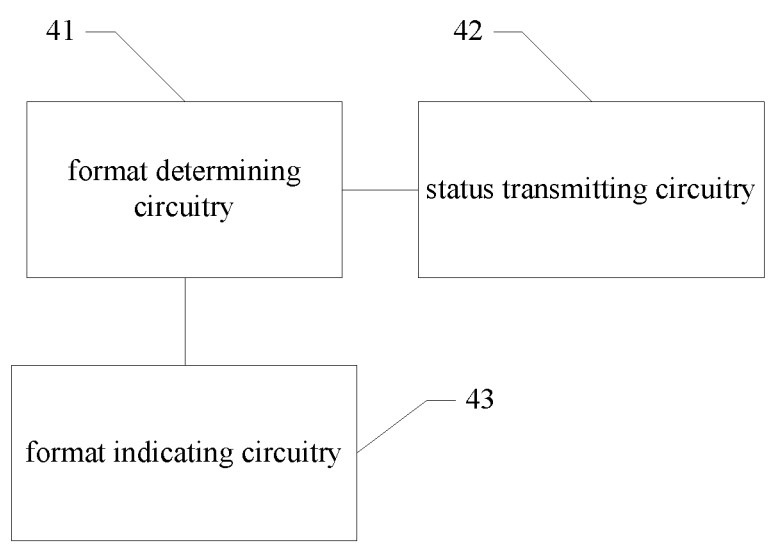
FIG. 4 schematically illustrates a structural diagram of an apparatus for transmitting status report applied for a receiver of embodiments of this disclosure.

The embodiment of the present disclosure also provides an apparatus for transmitting status report applied for a receiver, whose structure is shown in FIG. 4, which may include:

a format determining circuitry 41, may be configured to determine a format of a RLC status report;

a status transmitting circuitry 42, may be configured to transmit the RLC status report to a sender, according to the format of the RLC status report;

where the receiver is a receiver of a service data, and the sender is a sender of a service data.

In some embodiments, the format determining circuitry 41, may be configured to receive the format of the status report configured by the sender.

In some embodiments, the format of the RLC status report may be configured based on a different data radio bearer, or, the format of the RLC status report may be configured based on a data stream of different quality of service (QoS) flows on the same data radio bearer.

In some embodiments, where the format of the RLC status report may be configured by the receiver, and the apparatus for transmitting status report can further include: a format indicating circuitry 43, which may be configured to indicate the format of the RLC status report to the sender.

In some embodiments, the format indicating circuitry 43, may be configured to indicate the format of the RLC status report to the sender in the RLC status report.

In some embodiments, the format determining circuitry 41 may include:

a selection criterion receiving sub-circuitry, may be configured to receive a selection criterion configured for the RLC status report by the sender;

a format selecting sub-circuitry, may be configured to select and configure the format of the RLC status report from a pre-configured format according to the selection criterion.

In some embodiments, the selection criterion may include any of the following: selecting the format of the RLC status report according to a rate threshold of the data radio bearer or data stream; selecting the format of the RLC status report according to a number of bits required to transmit the RLC status report in different pre-configured formats; selecting the format of the RLC status report according to the number of RLC data packets transmitted in a single TTI; or selecting the format of the RLC status report according to the number of RLC data packets consecutively not received.

In some embodiments, the apparatus may select the format of the RLC status report according to any one of the following: a rate of a data radio bearer, a bit number of RLC status reports in different formats, a number of RLC data packets transmitted within a single TTI, the number of RLC data packets consecutively not received, or a device type of the receiver.

In some embodiments, the device type of the receiver may include a machine type communication device and a non-machine type communication device.

In some embodiments, the receiver is a user equipment and the sender is a base station, or, the receiver is a base station and the sender is a UE, or, both the sender and the receiver are both UEs.

Those skilled in the art can understand that all or a portion of the various methods of the various embodiments described above may be implemented by a program commands an associated hardware, which may be stored in a computer readable storage medium, which may include: ROM, RAM, disk or optical disk and the like.

Although the present disclosure is not disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for transmitting status report at a receiver, comprising:
   determining a format of a Radio Link Control (RLC) status report;
   transmitting the RLC status report to a sender, according to the format of the RLC status report; and
   wherein the receiver is a receiver of a service data, and the sender is a sender of a service data,
   wherein determining the format of the RLC status report comprises: identifying the format of the RLC status report configured by the sender, or configuring the format of the RLC status report by the receiver,
   wherein if the format of the RLC status report is configured by the receiver, the method further comprises indicating the format of the RLC status report to the sender, and
   wherein if the format of the RLC status report is configured by the receiver, determining the format of the RLC status report comprises: receiving a selection criterion configured for the RLC status report from the sender and selecting and configuring the format of the RLC status report from pre-configured formats according to the selection criterion including any one of the following: selecting the format of the RLC status report according to a rate threshold of the data radio bearer or data stream; selecting the format of the RLC status report according to the number of bits required to transmit the RLC status report in different pre-configured formats; selecting the format of the RLC status report according to the number of RLC data packets transmitted in a single transmission time interval (TTI); or selecting the format of the RLC status report according to the number of RLC data packets consecutively not received; or, if the format of the RLC status report is configured by the receiver, the format of the RLC status report is configured according to any one of the following: a rate of a data radio bearer, bit number of RLC status reports in different formats, the number of RLC data packets transmitted within a single TTI, the number of RLC data packets consecutively not received, or a device type of the receiver.

2. The method according to claim 1, wherein the format of the RLC status report is configured by the sender per data radio bearer, or, the format of the RLC status report is configured by the sender per quality of service flow mapped on a same data radio bearer.

3. The method according to claim 1, wherein the format of the RLC status report to the sender is indicated in the RLC status report.

4. The method according to claim 1, wherein the device type of the receiver comprises a machine type communication device and a non-machine type communication device.

5. The method according to claim 1, wherein the receiver is a user equipment and the sender is a base station, or, the receiver is a base station and the sender is a user equipment, or, both the sender and the receiver are user equipments.

6. An apparatus for transmitting status report applied for a receiver, comprising:
   a format determining circuitry, configured to determine a format of a Radio Link Control (RLC) status report; and
   a status transmitting circuitry, configured to transmit the RLC status report to a sender, according to the format of the RLC status report;
   wherein the receiver is a receiver of a service data, and the sender is a sender of a service data,
   wherein the format determining circuitry is configured to receive the format of the RLC status report configured by the sender, or determine the format of the RLC status report configured by the receiver,
   wherein if the format of the RLC status report is configured by the receiver, the apparatus further comprises a format indicating circuitry configured to indicate the format of the RLC status report to the sender, and
   wherein if the format of the RLC status report is configured by the receiver, the format determining circuitry comprises: a selection criterion receiving sub-circuitry, configured to receive a selection criterion configured for the RLC status report from the sender, and a format selecting sub-circuitry, configured to select and configure the format of the RLC status report from a pre-configured format according to the selection criterion including any one of the following: selecting the format of the RLC status report according to a rate threshold of the data radio bearer or data stream; selecting the format of the RLC status report according to the number of bits required to transmit the RLC status report in different pre-configured formats; selecting the format of the RLC status report according to the number of RLC data packets transmitted in a single transmission time interval (TTI); or selecting the format of the RLC status report according to the number of RLC data packets consecutively not received; or, if the format of the RLC status report is configured by the receiver, the format of the RLC status report is configured according to any one of the following: a rate of a data radio bearer, bit number of RLC status reports in different formats, the number of RLC data packets transmitted within a single TTI, the number of RLC data packets consecutively not received, or a device type of the receiver.

7. The apparatus according to claim 6, wherein the format of the RLC status report is configured by the sender per data radio bearer, or, the format of the RLC status report is configured by the sender per quality of service flow mapped on a same data radio bearer.

8. The apparatus according to claim 6, wherein the format indicating circuitry is configured to indicate the format of the RLC status report to the sender in the RLC status report.

9. The apparatus according to claim 6, wherein the device type of the receiver comprises a machine type communication device and a non-machine type communication device.

10. The apparatus according to claim 6, wherein the receiver is a user equipment and the sender is a base station, or, the receiver is a base station and the sender is a user equipment, or, both the sender and the receiver are user equipments.

* * * * *